United States Patent
Banavar et al.

(10) Patent No.: US 6,336,119 B1
(45) Date of Patent: Jan. 1, 2002

(54) METHOD AND SYSTEM FOR APPLYING CLUSTER-BASED GROUP MULTICAST TO CONTENT-BASED PUBLISH-SUBSCRIBE SYSTEM

(75) Inventors: Guruduth S. Banavar, Yorktown Heights, NY (US); Lukasz Opyrchal, Ann Arbor, MI (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/538,482

(22) Filed: Mar. 30, 2000

Related U.S. Application Data

(62) Division of application No. 08/975,280, filed on Nov. 20, 1997, which is a division of application No. 08/975,303, filed on Nov. 20, 1997.

(51) Int. Cl.[7] .............................................. G06F 17/00
(52) U.S. Cl. .................................... 707/104.1; 709/318
(58) Field of Search ........................... 707/1, 10, 103 Y, 707/103, 104.1; 709/200–204, 213, 217, 229, 318

(56) References Cited

U.S. PATENT DOCUMENTS

| 5,237,662 A | 8/1993 | Green et al. ................. 395/670 |
| 5,257,369 A | 10/1993 | Skeen et al. ................. 395/650 |

(List continued on next page.)

OTHER PUBLICATIONS

Lin et al "A Multicast Routing Protocol for Multihop Wireless Networks", Global Telecommunications Conference—Globecom'99, pp. 235–239.*

Cheung et al "Using Destination Set Grouping to Improve the Performance of Window–Controlled Multipoint Connections", IEEE 1995, pp. 388–395.*

Aharoni et al "Restricted Dynamic Steiner Trees for Scalable Multicast in Datagram Networks", IEEE 1998, pp. 286–297.*

D. Scott Alexander et al., "The Switch Ware Active Network Architecture," IEEE Network Special Issue on Active and Cotnrollable Networks, May/Jun. 1998, vol. 12, No. 3, pp. 29–36.

Uyless Black, TCP/IP & Related Protocols, Second Edition, McGraw–Hill, 1995, pp. 122–126.

Antonio Carzaniga, "Architectures for an Event Notification Service Scalable to Wide–area Networks". Available from http:www.cs.colorado.edu/users/carzaniga/siena/index.html. Dec. 1998.

Stephen E. Deering, "Multicast Routing in InternNetworks and Extended LANs," ACM Computer Communications Review, 18(4), 1988, pp. 55–64.

Birman, Kenneth P., "The Process Group Approach to Reliable Distributed Computing", Communications of the ACM, vol. 36, No. 12, pp. 37–53 (Dec. 1993).

(List continued on next page.)

*Primary Examiner*—Thomas Black
*Assistant Examiner*—Uyen Le
(74) *Attorney, Agent, or Firm*—Douglas W. Cameron, Esq.; Kevin P. Radigan, Esq.; Heslin Rothenberg Farley & Mesiti P.C.

(57) ABSTRACT

A facility is provided for implementing a content-based publish-subscribe system using a group-based multicast. The facility includes mapping all possible groups of the publish-subscribe system to a smaller number of multicast groups, wherein the smaller number of multicast groups include brokers and the brokers have consumers. The mapping includes clustering the brokers of the publish-subscribe system into C clusters of multicast groups, wherein each cluster of the C clusters has its own subset of multicast groups, and wherein C>1. The clustered multicast groups are then used to forward an event to consumers within the content-based publish-subscribe system by multicasting the event up to C times, each multicasting being to a different cluster of the C clusters.

36 Claims, 8 Drawing Sheets

U.S. PATENT DOCUMENTS

| | | | | |
|---|---|---|---|---|
| 5,321,813 | A | | 6/1994 | McMillen et al. .......... 395/200 |
| 5,398,012 | A | | 3/1995 | Derby et al. ........... 340/825.03 |
| 5,517,562 | A | | 5/1996 | McConnell ................. 379/207 |
| 5,522,046 | A | | 5/1996 | McMillen et al. ...... 395/200.15 |
| 5,535,322 | A | | 7/1996 | Hecht ......................... 395/155 |
| 5,557,798 | A | | 9/1996 | Skeen et al. ................ 395/650 |
| 5,566,337 | A | | 10/1996 | Szymanski et al. ......... 395/733 |
| 5,581,764 | A | | 12/1996 | Fitzgerald et al. .......... 395/703 |
| 5,612,957 | A | | 3/1997 | Gregerson et al. .......... 370/401 |
| 5,794,210 | A | * | 8/1998 | Goldhaber et al. ........... 705/14 |
| 5,831,975 | A | * | 11/1998 | Chen et al. .................. 370/256 |
| 5,867,799 | A | * | 2/1999 | Lang et al. ..................... 707/1 |
| 5,870,605 | A | | 2/1999 | Bracho et al. ............... 395/682 |
| 5,873,084 | A | | 2/1999 | Bracho et al. ................ 707/10 |
| 5,881,315 | A | | 3/1999 | Cohen ......................... 395/872 |
| 5,905,871 | A | * | 5/1999 | Buskens et al. ............ 709/245 |
| 5,920,856 | A | * | 7/1999 | Syeda-Mahmood ............ 707/3 |
| 5,946,311 | A | * | 8/1999 | Alexander, Jr. et al. ..... 370/395 |
| 5,974,417 | A | * | 10/1999 | Bracho et al. ................ 707/10 |
| 6,021,443 | A | * | 2/2000 | Bracho et al. .............. 709/241 |
| 6,029,195 | A | * | 2/2000 | Herz .......................... 709/219 |
| 6,044,372 | A | * | 3/2000 | Rothfus et al. ............... 707/10 |
| 6,088,333 | A | * | 7/2000 | Yang et al. .................. 370/238 |
| 6,091,724 | A | * | 7/2000 | Chandra et al. ............ 370/390 |
| 6,094,688 | A | * | 7/2000 | Mellen-Garnett et al. ... 709/328 |
| 6,101,180 | A | * | 8/2000 | Donahue et al. ............ 370/352 |
| 6,216,132 | B1 | * | 4/2001 | Chandra et al. ............ 707/103 |

OTHER PUBLICATIONS

Oki et al., "The Information Bus—An Architecture for Extensible Distributed Systems", SIGOPS '93, ACM 0–89791–632–8/93/0012, pp. 58–68 (1993).

Cahoon et al., "Performance Evaluation Of A Distributed Architecture For Information Retrieval", SIGIR Forum (USA), Zurich, Switzerland, pp. 110–118 (Aug. 1996).

Powell, David, "Group Communication", Communications of the ACM, vol. 39, No. 4, pp. 52–100 (Apr. 1996).

Lorenzo Aguilar, "Datagram Routing for Internet Multicasting," ACM Computer Communications Review, 14(2), 1984, pp. 58–63.

John Gough and Glenn Smith, "Efficient Recognition of Events in a Distributed System," Proceedings of ACSC–18, Adelaide, Australia, 1995.

Bill Segall and David Arnold, "Elvin has left the building: A publish/subscribe notification service with quenching," Proceedings of AUUG97, Brisbane, Austrailia, Sep. 1997, Available from http://www.dstc.edu.au/Elvin/papers/AUUG97//AUUG97.html.

R. Sharma, S. Keshav, M. Wu and L. Wu, "Environments for Active Networks," Proceedings of the IEEE 7th International Workshop on Network and Operating System Support for Digital Audio and Visual, 1997, pp. 77–84.

Tony Speakman, Dino Farinacci, Steven Lin and Alex Tweedly, "PGM Reliable Transport Protocol," IETF Internet Draft, Aug. 24, 1998.

D. Tennenhouse, J. Smith, W.D. Sincoskie, D. Wetherall, G. Minden, "A Survey of Active Network Research," IEEE Communications Magazine, Jan., 1997, vol. 35, No. 1, pp. 80–86.

Cormen, Thomas H., Leiserson Charles E. and Rivest, Ronald L., Introduction to Algorithms, Ch. 24, "Minimum Spanning Trees," pp. 498–513, McGraw–Hill Book Company (1990).

Internet World Wide Web Site Section entitled "TIB/Rendezvous White Paper," located at Web Site http://www.rv.tibco.com/rvwhitepaper.html, printed pp. 1–16, (1994–1997).

Inernet World Wide Web Site Section entitled "Intranet/Internet," located at Web Site http://www.tibco.com/products/internet.html, printed p. 1 of 1, date printed from Internet Apr. 29, 1997, actual date of paper unknown.

Internet World Wide Web Site Section enttiled "TIBnet Overview," located at Web Site http://www.tibco.com/announce/tibwhite.html, printed pp. 1–5, date printed from Internet Apr. 29, 1997, actual date of paper unknown.

Internet World Wide Web Site Section entitled "NEONet Product Overview," located at Web Site http://www.neonsoft.com/prods/neonover.html, printed pp. 1–18, date printed from Internet Oct. 20, 1997, actual date of paper unknown.

Skeen, Dale Ph.D. and Vitria Technology, Inc. "Velociti The Enterprise–Capable Publish–Subscribe Server," located at Internet World Wide Web Site http://www.vitria.com/whitepapers/velocitiwp.html, printed pp. 1–17, date printed from Internet Jan. 14, 1998, actual date of paper unknown.

Allison, C. Harrington, P., Huang, F. and Livesey, M., "Scalable Services for Resource Management in Distributed and Networked Environments", IEEE Comput, Soc. Press, ix+173, pp. 98–105(1996).

Weiss, R., Velez, B., Sheldon, M.A., Namprempre, C., Szilagyi, P., Duda, A. and Gifford, D.K., HyPursuit: A Hierarchical Network Search Engine That Exploits Content–Link Hpertext Clustering: {IN Seventh ACM Conference on Hypertext; Hypertext '96, Proceedings of Hypertext '96, Washington, D.C., USA, Mar. 16–20, 1996, ACM, xiii+264, pp. 180–193} (Abstract Only).

Hanson, et al., "A Predicate Matching Algorithm for Database Rule Systems", Published at Proceedings of SIGMOD, pp. 271–280 (1991).

Mishra et al., "Consul: A Communication Substrate for Fault–Tolerant Distributed Programs", TR91–32, Department of Computer Science, The University of Arizona, pp. 1–33 (Nov. 1991).

\* cited by examiner

METHOD AND SYSTEM FOR APPLYING CLUSTER-BASED GROUP MULTICAST TO CONTENT-BASED PUBLISH-SUBSCRIBE SYSTEM

CROSS-REFERENCE TO RELATED APPLICATIONS

This application is a division of U.S. application Ser. No. 08/975,280, filed Nov. 20, 1997 which is a division of U.S. application Ser. No. 08/975,303, filed Nov. 20, 1997.

This application contains subject matter which is related to the subject matter of the following applications, each of which is assigned to the same assignee as this application. Each of the below listed applications is hereby incorporated herein by reference in its entirety:

"Method And System For Matching Consumers To Events," Astley et al., Ser. No. 08/975,280, filed Nov. 20, 1997, now U.S. Pat. No. 6,216,132;

"Routing Messages Within A Network Using The Data Content Of The Message," Chandra et al., Ser. No. 08/975,303, filed Nov. 20, 1997, now U.S. Pat. No. 6,091,724; and "Method And System For Matching Consumers To Events Employing Content-Based Multicast Routing Using Approximate Groups," Astley et al., Ser. No. 09/538,471, co-filed herewith, now pending.

TECHNICAL FIELD

This invention relates, in general, to event computing systems and, more particularly, to a content-based multicast routing technique which delivers events to consumers of an event computing system interested in a particular set of events.

BACKGROUND ART

A common practice for integrating autonomous components within a computing system has been to utilize events. Events are, for example, data generated by a provider and delivered through a communication medium, such as a computer network, hard disk, or random access memory, to a set of interested consumers. The providers and consumers need not know one another's identity, since delivery is provided through intermediary software. This independence between provider and consumer is known as decoupling.

One example of an event computing system is a database event system. Modern database systems include support for event triggers. Event triggers associate a filter, which is a predicate that selects a subset of events and excludes the rest, with an action to take in response to events on the database. An event on a database is any change to the state of the database.

In database event systems, gating tests have been used to determine which consumers of a system are interested in a particular event. That is, gating tests have been used to match filters in event triggers to events. As described in "A Predicate Matching Algorithm for Database Rule Systems," by Hanson et al., Proceedings of SIGMOD (1991), pp. 271–280, gating tests identify a single predicate for each filter as primary, and tests are organized in a data structure based on this primary predicate. Additionally, the data needs to be organized based on the primary predicate.

Another example of an event computing system is a distributed event system, also known as a publish/subscribe system. A publish/subscribe system is a mechanism where subscribers express interest in future information by some selection criterion, publishers provide information, and the mechanism delivers the information to all interested subscribers. Current publish/subscribe systems organize information around subjects (also called channels or streams). Providers or publishers publish events to groups and consumers or subscribers subscribe to all data from a particular group.

One example of a publish/subscribe system is described in detail in U.S. Pat. No. 5,557,798, issued to Skeen et al. on Sep. 17, 1996, and entitled "Apparatus And Method For Providing Decoupling Of Data Exchange Details For Providing High Performance Communication Between Software Processes", which is hereby incorporated herein by reference in its entirety. In U.S. Pat. No. 5,557,798, the publisher of an event annotes each message with an identifier called a subject and a subscriber subscribes to a particular subject. Thus, if a subscriber is interested in just a portion of the events having a given subject, it would have to receive the entire subject and then discard the unwanted information.

Based on the foregoing, a need exists for a matching capability that does not require the partitioning of data into subjects. A further need exists for a matching capability that enables a consumer to use any filtering criterion expressible with the available predicates. Additionally, a need exists for a mechanism that allows a consumer to receive only the information that it desires, such that the filtering is done independent of the consumer.

SUMMARY OF THE INVENTION

One approach to addressing the above-noted needs is described in the above-incorporated, co-pending U.S. patent application Ser. No. 08/975,280, entitled "Method and System for Matching Consumers to Events." In this approach, referred to herein as a content-based event computing system, the matching facility includes a search data structure (e.g., a search tree or search graph), which is used to determine the consumers interest in a particular event. Content-based subscription is the ability of subscribers to specify interest in events based on operations limited only by the structure of the events and the operation supported by the pattern language.

Applicants have identified a problem arising with content-based subscription which arises when using group based multicast such as internet protocol (IP) multicasting of an event. In a practical content-based subscription system, there will typically be too many groups of clients or consumers to use a multicast facility.

As one example, the environment of this invention may include content-based, publish/subscribe systems deployed over IP networks such as the Internet. Clients are either publishers or subscribers, and are attached to machines referred to herein as brokers. The publisher's broker receives a published message (also referred to herein as an "event") and delivers it to subscriber brokers at least one of whose attached clients has a subscription matched by the message. These subscriber brokers then forward the message to the at least one attached client. Content-based systems are more flexible and provide more selectivity than subject-based systems. However, the multicast problem for content-based message delivery middleware is more complex than for subject-based delivery once the number of destinations for messages becomes large. It may no longer be straightforward or efficient to use IP multicast groups to distribute messages of a content-based system over a network because the number of such groups required grows rapidly with the number of subscriptions. This number eventually becomes so large that either the supported range of multicast addresses is exceeded or the overhead of setting up and listening to such a large number of multicast addresses becomes excessive. The present invention addresses this problem.

To summarize, provided herein is of a method for implementing a content-based publish-subscribe system using a group-based multicast. The method includes: mapping possible groups of the publish-subscribe system to a smaller number of multicast groups, wherein the smaller number of multicast groups includes brokers, and the brokers have consumers; and using the smaller number of multicast groups to forward an event to consumers within the content-based publish-subscribe system.

In another aspect, the present invention includes at least one program storage device readable by a machine, tangibly embodying at least one program of instructions executable by the machine to perform a method of implementing a content-based publish-subscribe system using a group-based multicast. The method includes: mapping possible groups of the publish-subscribe system to a smaller number of multicast groups, wherein the smaller number of multicast groups comprise brokers, the brokers having consumers; and using the smaller number of multicast groups to forward an event to consumers within the content-based publish-subscribe system.

In a further aspect, a system for implementing a content-based publish-subscribe system using a group-based multicast is provided. The system includes means for mapping possible groups of the publish-subscribe system to a smaller number of multicast groups, wherein the smaller number of multicast groups comprise brokers, and the brokers have consumers. The system further includes means for using the smaller number of multicast groups to forward an event to consumers within the content-based publish-subscribe system.

To restate, the present invention applies clustering to group multicast-based implementations of a content-based publish-subscribe system. Furthermore, as an enhancement, the invention employs thresholding to further reduce the number of groups required. These processes, referred to herein as cluster group multicast (CGM), provide multiple advantages over existing art. For example, under conditions of high match rate (i.e., very few subscribers are interested in any given event) and high regionalism (i.e., subscribers interested in an event are geographically co-located), CGM is superior to flooding (described herein below). In addition, when the cost of fringe-links (i.e., links connecting brokers to the network) is highest, CGM is superior to other group multicast techniques. Advantageously, group assignments in CGM are static and can be created independent of the subscriptions. Furthermore, it is possible to apply CGM to reasonably sized broker networks in Internet protocol (IP) version 4 and version 6.

Additional features and advantages are realized through the techniques of the present invention. Other embodiments and aspects of the invention are described in detail herein and are considered part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

As briefly noted above, a content-based publish-subscribe system disseminates information in the form of "events" from those producing information (publishers), to interested parties (subscribers). The advantage of a content-based publish-subscribe system is that subscribers receive only those events for which they have expressed an interest. One way of expressing information is by specifying a predicate over an event schema.

Figure 1:
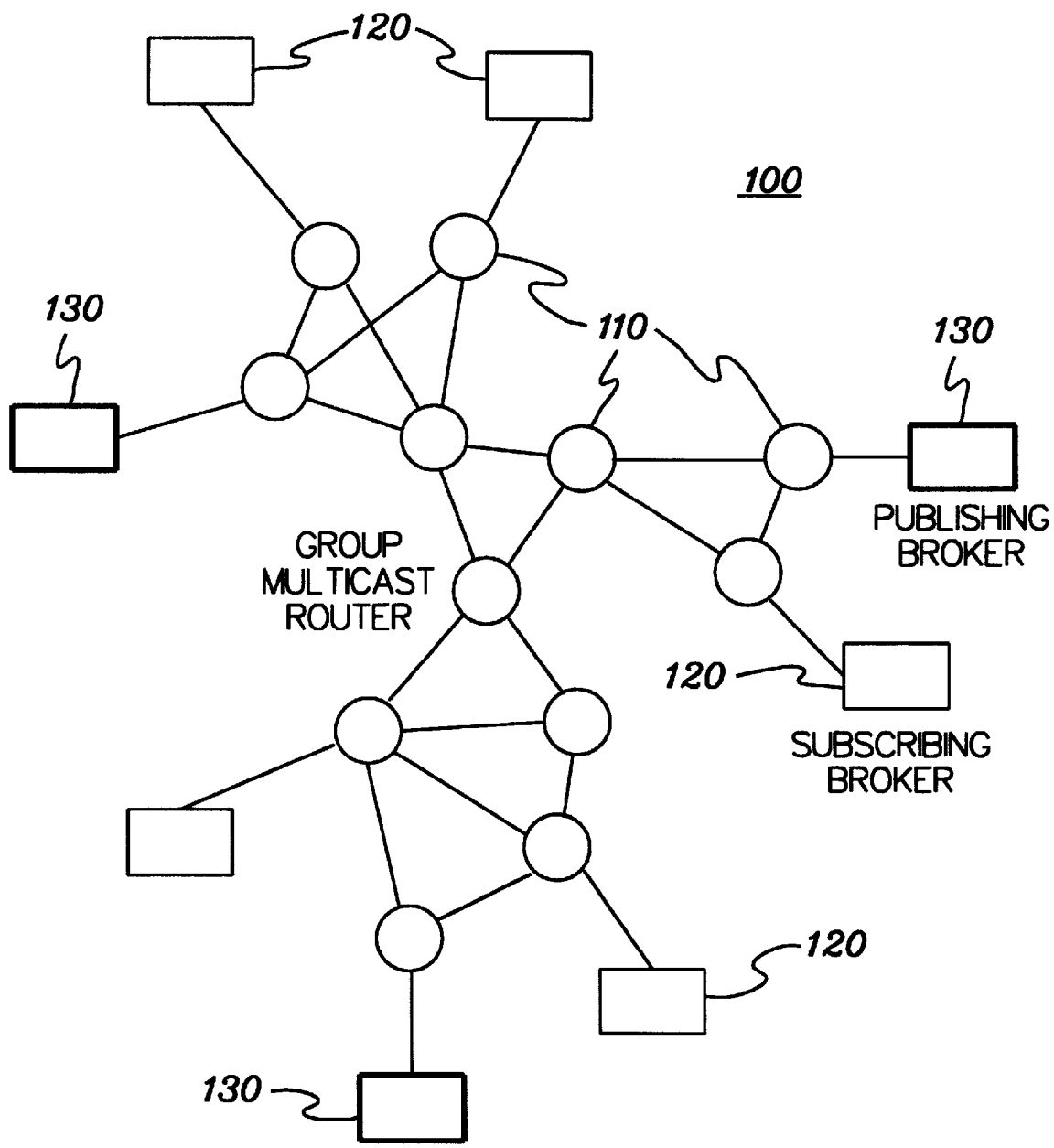
FIG. 1 depicts a sample environment for deployment of one embodiment of a cluster group multicast (CGM) facility in accordance with the present invention.

As shown in FIG. 1, a scalable publish-subscribe system, generally denoted 100, is commonly realized on networks of "broker" nodes, connected by "router" nodes 110. Subscribing clients connect to subscribing brokers 120 and register their interest in particular types of events. Likewise, publishers connect to publishing broker nodes 130, and publish events. The brokers are responsible for tracking subscriptions and for routing events from publishers to the appropriate set of subscribers.

Implementations of publish-subscribe systems on today's network infrastructure are typically based on either matching near the subscriber or matching near the publisher.

Matching near the subscriber is called "flooding". In the flooding approach, every event is broadcast to all brokers, which in turn match the event and deliver it to their subscribers. This approach is inefficient since brokers that may not eventually need the message still receive the event and thus consume valuable network bandwidth. The situation is particularly bad when subscriptions are regional in nature.

When an event is matched near the publisher, it can be routed to the right set of subscribing brokers by using (1) point-to-point broker connections, (2) destination lists, or (3)

group multicast between brokers. Point-to-point routing is inefficient because it fails to take advantage of the common paths between brokers. Routing via destination lists is not scalable since message headers, and thus the message itself can grow quickly. Moreover, routing via destination lists is not directly supported by routers in current day network infrastructure.

That leaves the approach of routing via group multicast, to which the present invention is directed. Straightforward implementations using group multicast-based routing, such as an internet protocol (IP) multicast, produce systems that are not scalable in the number of groups required. For example, a system with N endpoints requires $2^N$ groups. Using the currently deployed version of IP, this means that systems may not have more than 24 endpoints, since the number of groups supported in the best case is $2^{24}$.

Thus, this invention is concerned with the problem of efficiently matching an event against a set of subscriptions and routing it from its publisher to subscribers within a network of publish-subscribe brokers. Furthermore, this invention is concerned with solving the problem within the context of existing internet infrastructure and under expected distributions of subscriptions. One such expected subscriber distribution is called a "regional distribution" in which subscribers with similar interest are located in the same geographical region of the network, and furthermore, publishers that produce events of interest may lay within the same region as well.

Clustering is an existing technique for reducing the number of groups required for message distribution. This invention applies the clustering technique to group multicast based implementations of a content-based publish-subscribe system. Furthermore, this invention applies the technique of thresholding (described later) to further reduce the number of groups required.

The CGM process described herein is based on the use of clusters: mutually exclusive subsets of brokers where each subset has its own set of multicast groups. We observe that if we divide N endpoints into 2 clusters, we reduce the number of groups in each cluster to $2^{N/2}$ groups, and the total number of groups to two times that. The cost of this approach, however, is that it may be necessary to multicast an event twice: once to a group in each cluster. In general, if we divide N into C clusters, the total number of groups needed is given by $g=C(2^{N/C})$. So, for example, if we have $2^{13}$ multicast groups available, we can support 80 broker endpoints by dividing them into 8 clusters of 10 brokers each. Since the groups within a cluster enumerate all possible combinations of brokers, each broker must join half these groups (those that include the broker) at system configuration time.

Each broker contains an instance of the subscription matching engine with entries for all client subscriptions, and sorts the resulting list of brokers by cluster. It then looks up the group in each cluster that contains, for example, exactly those brokers destined to receive the event. The publisher's broker then performs up to C multicasts, where C is the number of clusters. Some clusters may have no matching brokers and are therefore skipped.

The choice of cluster assignment has a significant impact on performance. For example, brokers that match a single subscription, but that are spread over multiple clusters will require multiple multicasts. One approach to clustering is to build clusters by grouping brokers with similar subscription sets. Another approach is to use geographic (or network) location data to group brokers into clusters. This latter approach performs well in the case when subscribers that are geographically co-located also have similar subscriptions, i.e., there is "regionalism" of subscriptions.

The number of groups required by the CGM process may be reduced further by reducing the precision of the algorithm. One approach to reducing the precision is to flood a cluster when more than a threshold number of brokers within that cluster need to receive an event. That is, the process behaves like CGM unless the number of destinations in a cluster exceeds a threshold, at which point the event is multicast to the entire cluster. This algorithm is referred to herein as threshold CGM (or TCGM).

For each cluster, we pick a threshold T, with T<K, where K is the size of the cluster. If an event matches more than T endpoints, the event is sent to all brokers in the cluster. Otherwise, the event is sent only to the brokers subscribed to the event (as in CGM). This process requires multicast groups for all subsets of brokers in a cluster of size T or smaller, plus one additional multicast group for an "all brokers" multicast in the cluster. The group requirement for TCGM can be many orders of magnitude smaller than in the case of CGM.

Figure 2:
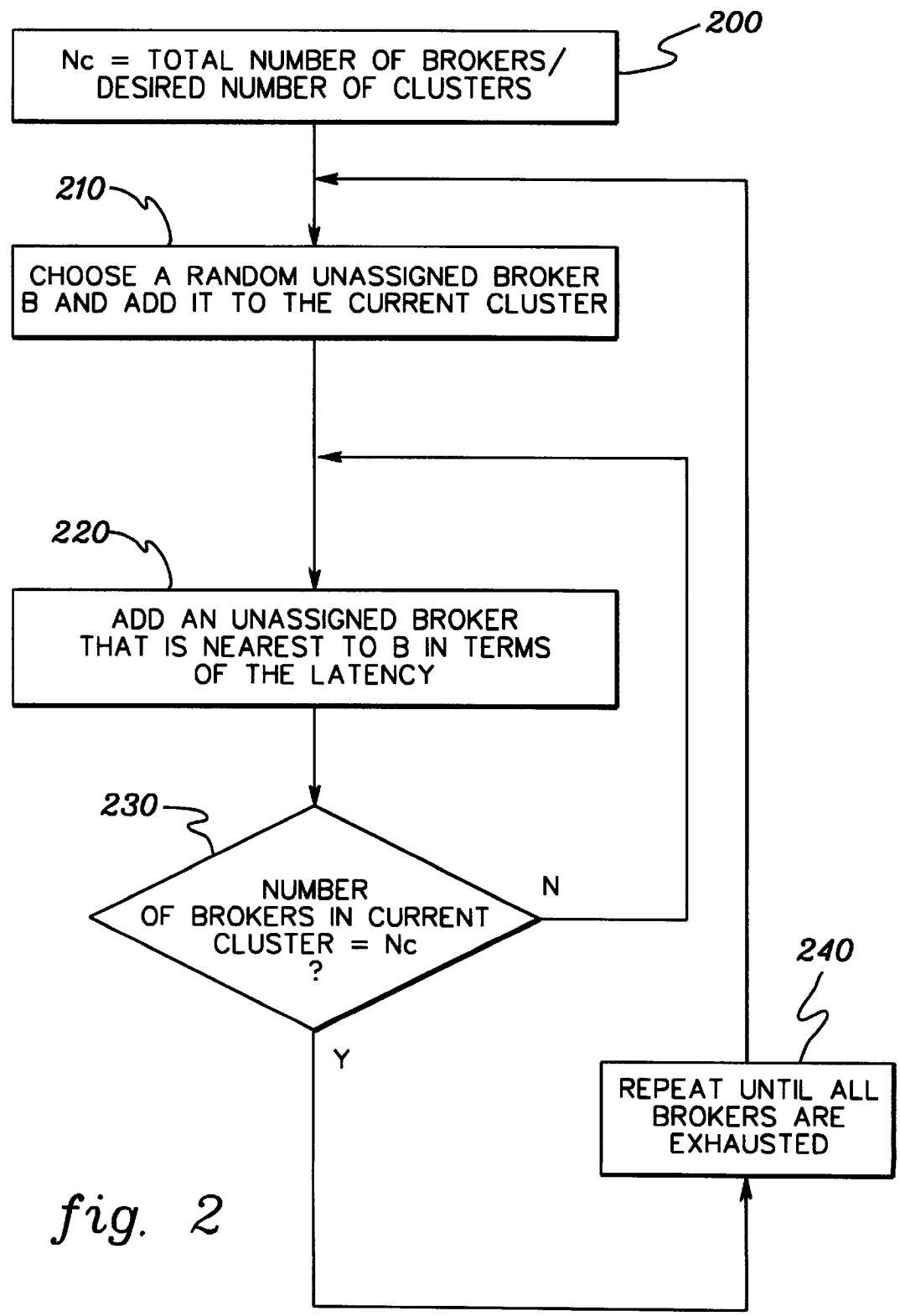
FIG. 2 is a flowchart of one embodiment of a clustering process for a CGM facility in accordance with the present invention.

As noted, in accordance with the present invention a broker network, for example, network 100 of FIG. 1, needs to be divided into a number of clusters, C. FIG. 2 depicts one embodiment of a clustering process for achieving this. In this process, the variable Nc is defined as the total number of brokers divided by the desired number of clusters 200. Once Nc is defined, the process begins by choosing a random unassigned broker in the network 210. An unassigned broker that is nearest to broker B in terms of latency is selected for inclusion in the current cluster 220. This process continues until the number of brokers in the current cluster equals Nc 230. As the process proceeds, each visited broker is marked as assigned and the process continues until all C clusters are defined and all brokers are assigned to a cluster 240. Note that the process of FIG. 2 for creating clusters is provided by way of example only, i.e., several alternative processes are also possible.

Figure 3A:
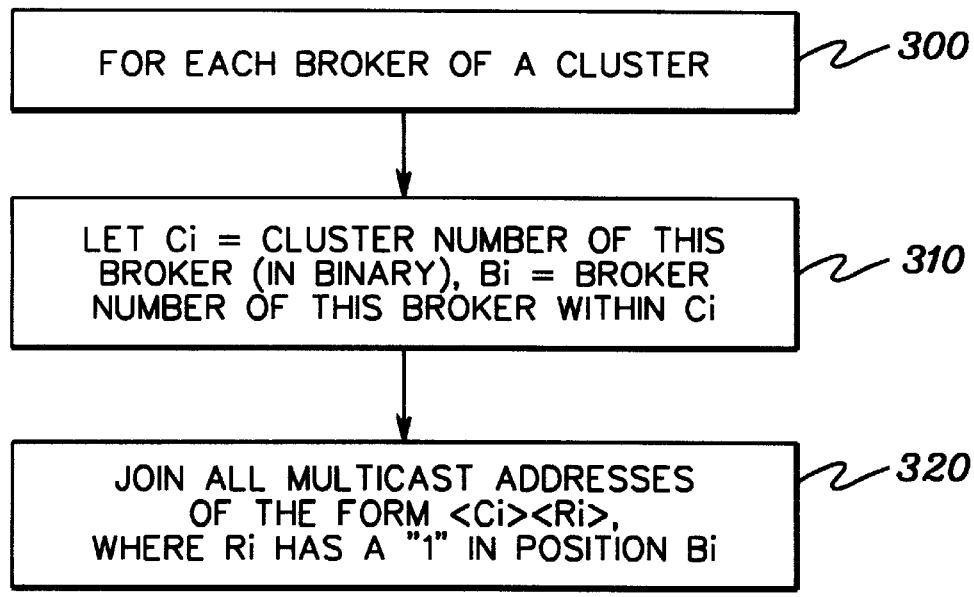
FIG. 3A is a flowchart of one process embodiment for configuring brokers for cluster group multicast in accordance with the principles of the present invention.

Before the publish-subscribe system can begin accepting subscriptions and published events, the system must be configured. Note that this configuration occurs once and is static, i.e., unless the network itself changes. For the clustered group multicast (CGM) process presented herein, this configuration can be performed using the process of FIG. 3A. Initially, each broker 300 is assumed to be associated with a cluster Ci, and assigned a broker number Bi within the cluster Ci. The cluster number for the broker is expressed in binary, while Bi is the broker number for the broker within Ci 310. Multicast addresses are normally represented as binary strings. The group multicast addresses that a broker must join have the cluster number Ci (in binary) as their high order bits and a "1" in the position corresponding to the broker number Bi 320. Essentially, this process determines each individual subset or group of the total number of brokers in the cluster, represents each broker as a single bit, and makes each broker join all of the groups which have addresses with "1" in the position of that broker number within the cluster.

Figure 3B:
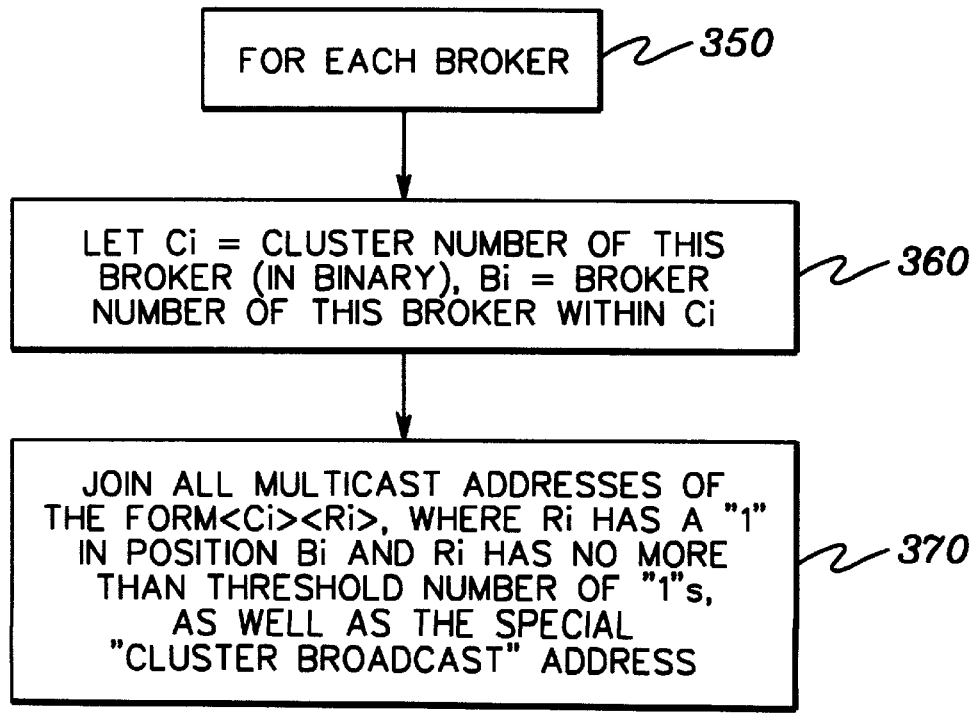
FIG. 3B is a flowchart of an alternate embodiment for configuring brokers for cluster group multicast in accordance with the principles of the present invention, wherein a threshold number is employed to signal use of a special cluster broadcast address.

As an alternate embodiment, FIG. 3B depicts a process for configuring brokers when a threshold cluster group multicast (TCGM) is to be employed. Again, each broker 350 is assumed to be associated with a cluster Ci, and is assigned a broker number Bi within the cluster Ci 360. For this process, the multicast addresses to join are determined by selecting all addresses that have a "1" in the position Bi, the broker number, and further, by selecting only those addresses that have no more 1s than a threshold number. Each broker in a cluster also joins a special group address, referred to herein as the "all brokers" or "cluster broadcast" address 370.

Figure 4A:
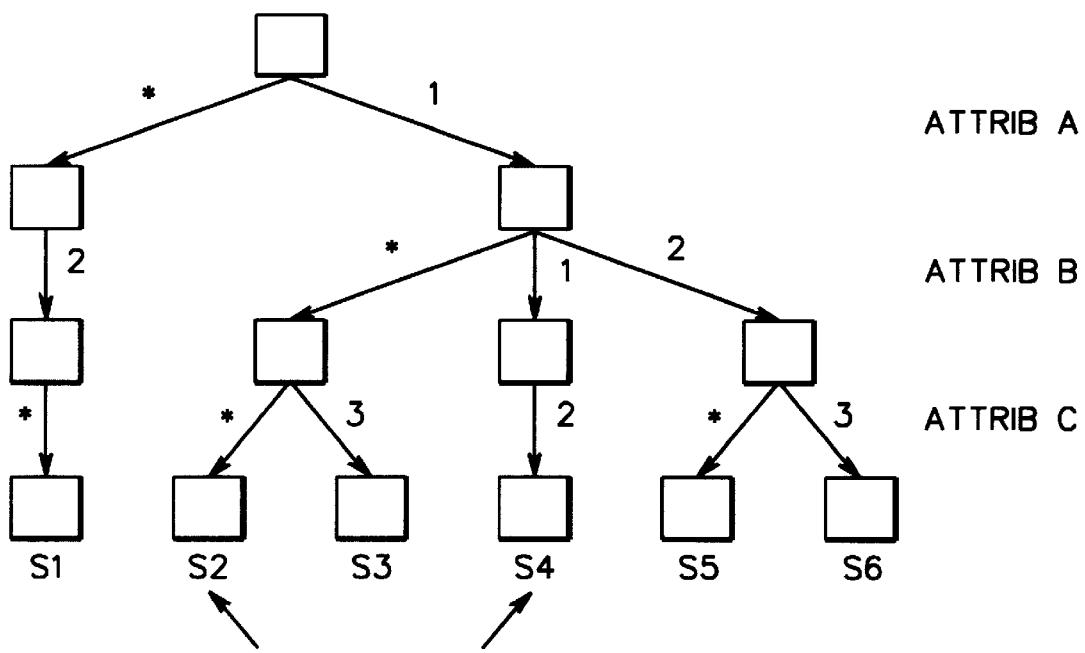
FIG. 4A depicts a publisher matching data structure for use in event matching using cluster group multicast in accordance with the present invention.
Figure 4B:
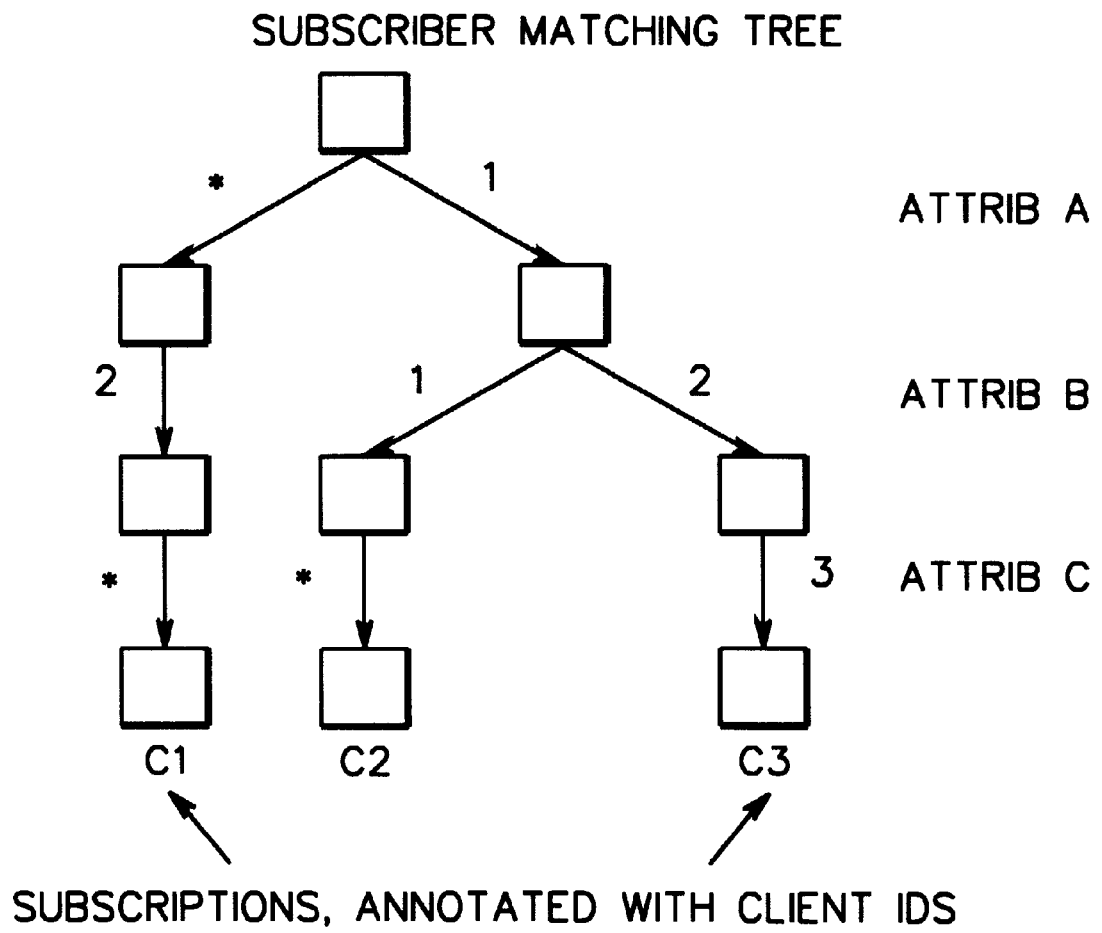
FIG. 4B is a subscriber matching data structure for use in event matching using cluster group multicast in accordance with the present invention.

The subscription propagation and event matching and routing processes in accordance with this invention are written based on the data structures that are maintained by each broker. Exemplary embodiments of these data structures are depicted in FIGS. 4A & 4B, wherein a publisher matching tree and a subscriber matching tree are shown, respectively. Each publishing broker maintains a matching tree of all subscriptions in which each leaf is annotated with a bit vector as shown in FIG. 4A. The bit vector annotation has C rows and a number of columns K equal to the number of brokers in each cluster. The "*" shown in these figures comprises a "don't care" meaning that the path is traversed irrespective of the attribute value. Don't cares are described in greater detail in the initially incorporated United States Patent application entitled "Method and System for Matching Consumers to Events." The trees are traversed by comparing attribute values with values of the published event. As shown in FIG. 4B, the subscribing brokers contain a matching data structure used to match events to those subscriptions that are applicable to the clients of that broker. As shown, leaf nodes in this tree are annotated with identifiers of all the clients that match a particular subscription.

Figure 5:
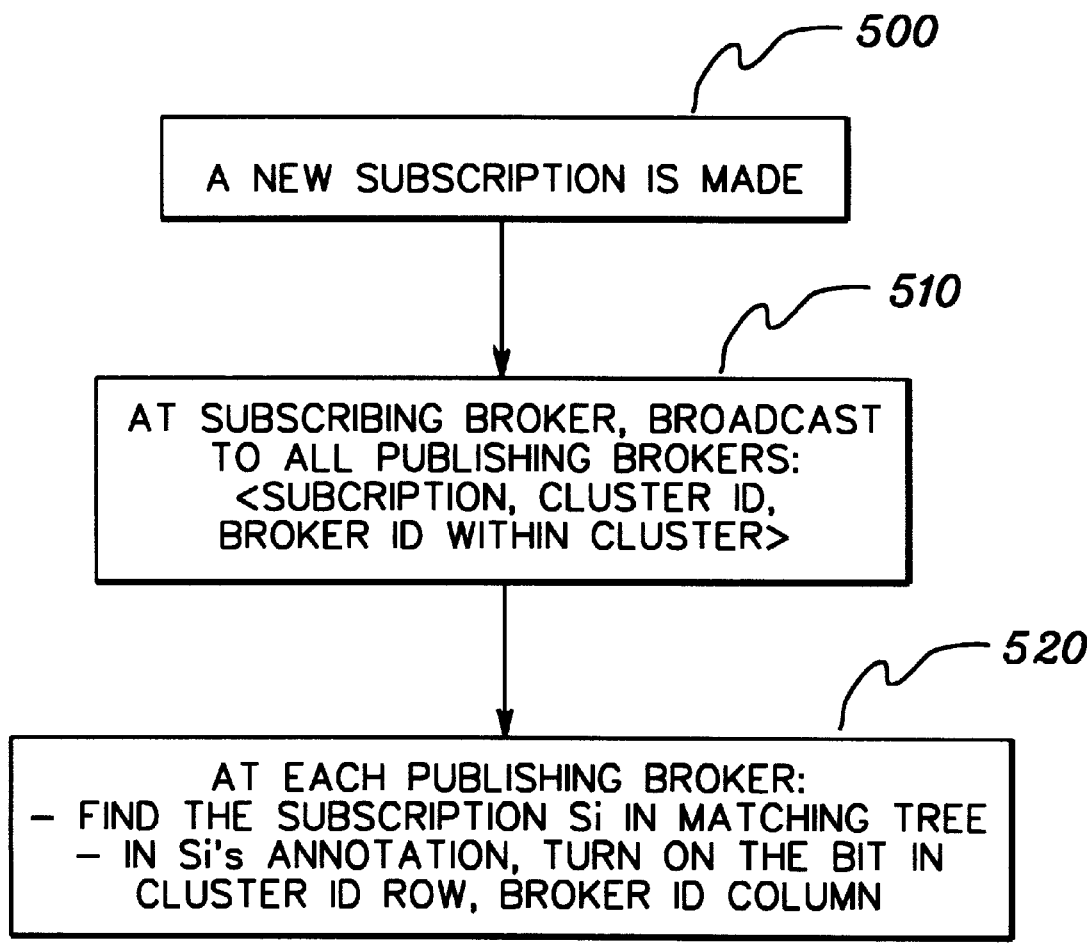
FIG. 5 is a flowchart of one embodiment of a subscription propagation process in accordance with the principles of the present invention.

FIG. 5 depicts one embodiment for propagating new subscriptions throughout the system. Once a new subscription is made 500, the subscription itself is broadcast by the receiving broker, along with a cluster id of the subscribing broker and the broker id of the subscribing broker within the cluster 510. At each publishing broker, the broker finds the subscription Si in the publisher matching data structure (FIG. 4A), and in the Si's annotation, the publishing broker turns on the corresponding bit in the cluster id row, broker id column 520.

Figure 6A:
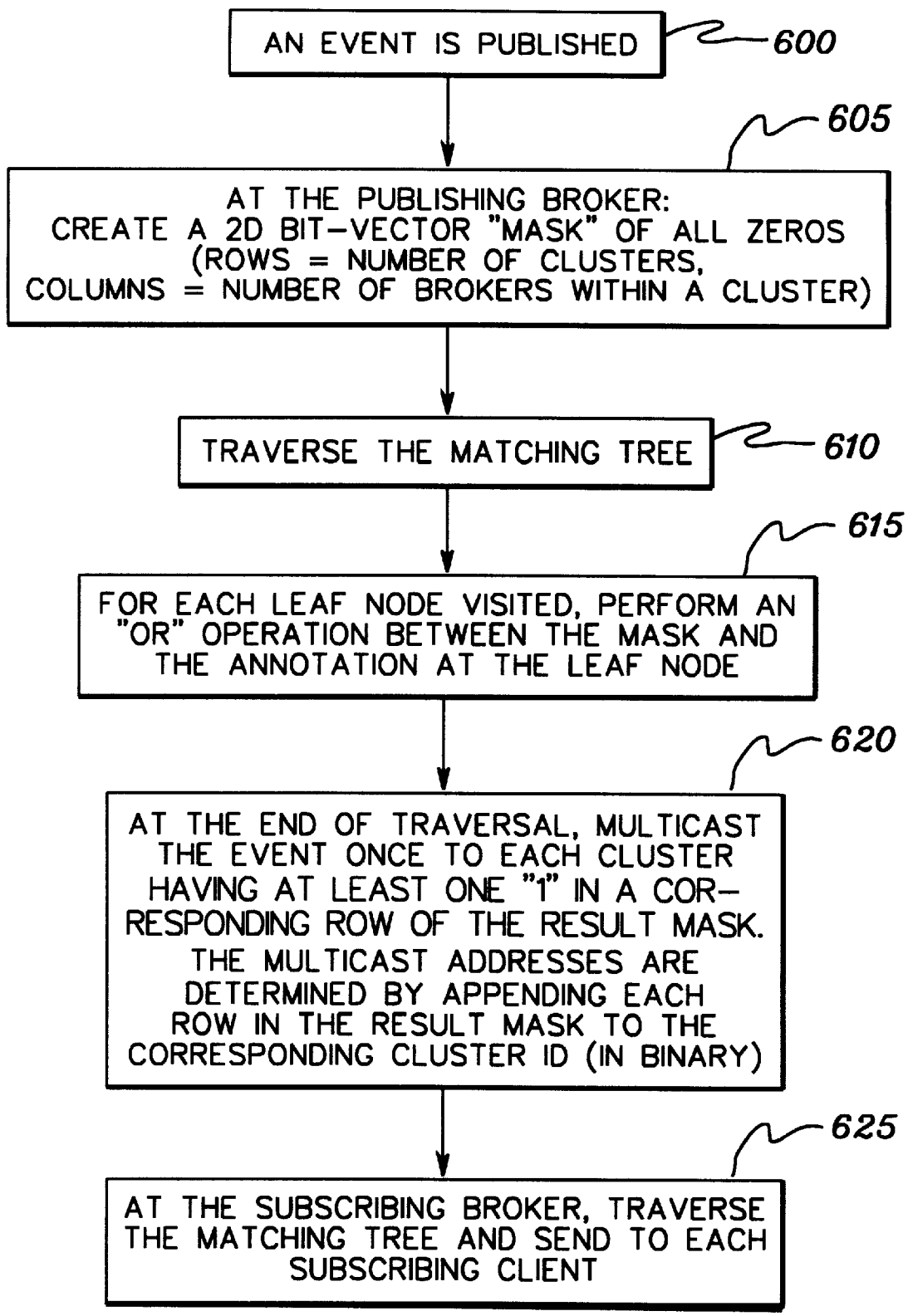
FIG. 6A is a flowchart of one embodiment for matching an event to a subscribing client using cluster group matching (CGM) in accordance with the principles of the present invention.

FIG. 6A depicts one embodiment of cluster group multicast (CGM) in accordance with the principles of the present invention. Once an event is published 600, then at the publishing broker, a 2D bit-vector "mask" of all zeros is created, where the number of rows is the same as the number of clusters, and the number of columns equals the number of brokers within a cluster 605. The publisher matching tree (FIG. 4A) is then traversed 610, and for each leaf node visited, an OR operation is performed between the mask and the annotation of the leaf node 615. At the end of this traversal, the event is multicast once to each cluster containing at least one interested subscriber 620. The multicast addresses are determined by appending each nonzero row in the result mask to the corresponding cluster id (in binary). The group multicast infrastructure that exists within the routers will then deliver the event to the subscribing brokers in the clusters. At each subscribing broker, the subscriber matching tree (FIG. 4B) is traversed and the event is sent to each subscribing client 625.

Figure 6B:
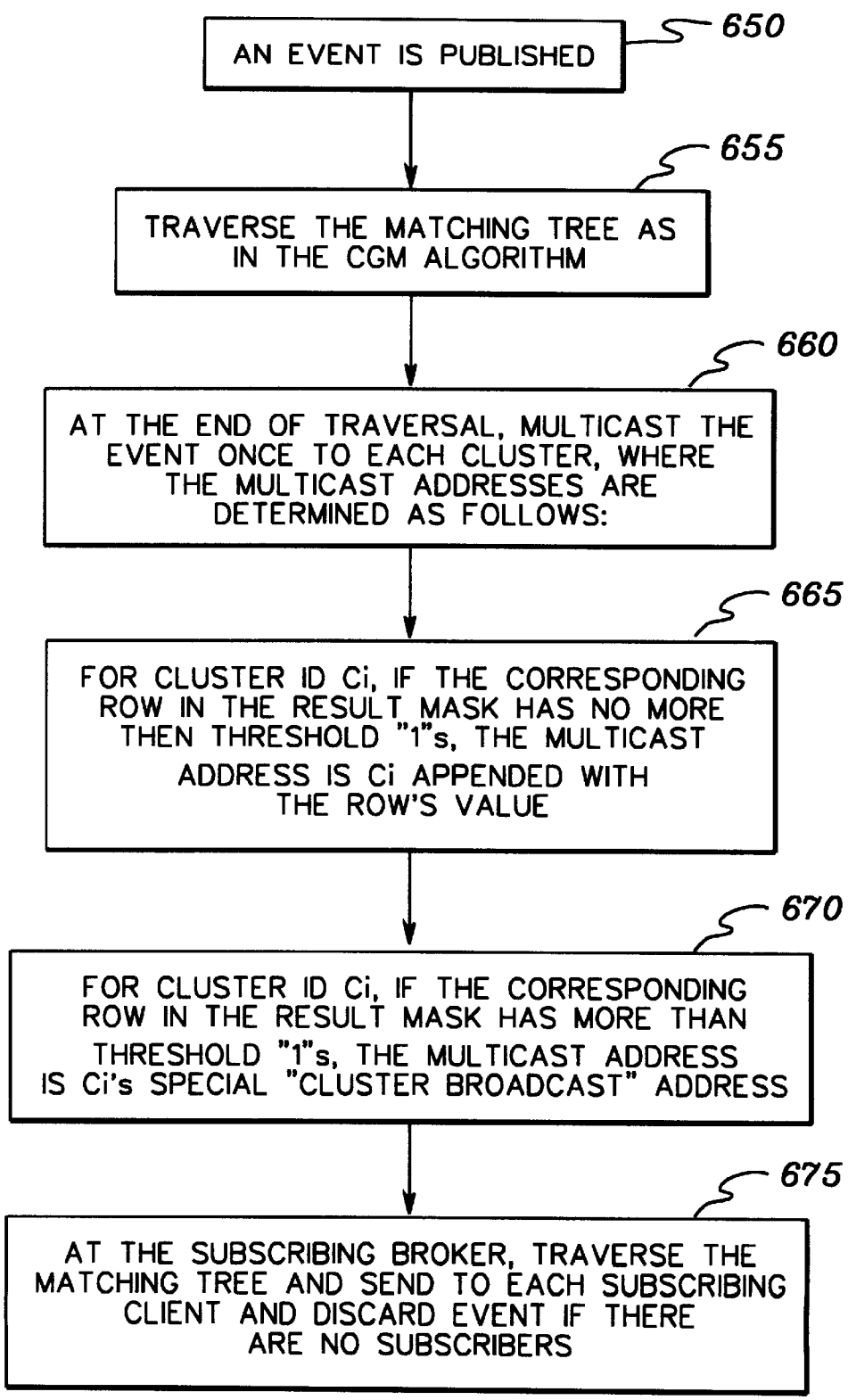
FIG. 6B is a flowchart of one embodiment for matching an event to a subscribing client using threshold cluster group matching (TCGM) in accordance with the principles of the present invention.

FIG. 6B depicts an alternate cluster group matching process, herein referred to as the threshold cluster group multicast (TCGM) process which employs the above-discussed thresholding technique. An event is again published 650 and the publisher matching tree is traversed 655 as described above in connection with the CGM process of FIG. 6A. At the end of this traversal, the event is multicast once to each cluster, where the multicast addresses are determined as follows 660: for each cluster id Ci, if the corresponding row in the result mask has a nonzero number of "1s", but no more than a "threshold", the multicast address is Ci appended with the row's value 665. For cluster id Ci, if the corresponding row in the result mask has more than the threshold of 1s, the multicast address is Ci's special "cluster broadcast" address 670. At the subscribing broker, the subscriber matching tree is again traversed and the event is sent to each subscribing client 675. If there are no subscribing clients, then the event is discarded.

Note that the present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method of implementing a content-based publish-subscribe system using a group-based multicast, said method comprising:

mapping possible groups of the content-based publish-subscribe system to a smaller number of multicast groups, wherein said smaller number of multicast groups comprise brokers, said brokers having consumers;

using the smaller number of multicast groups to forward an event to interested consumers within the content-based publish-subscribe system;

wherein said mapping comprises clustering brokers of the published-subscribe system into C clusters, wherein each cluster of said C clusters has its own subset of multicast groups, and wherein C>1; and wherein said using comprises multicasting the event to interested consumers using the smaller number of groups, and wherein said multicasting comprises multicasting the event up to C times, each multicasting being to interested consumers within a different cluster of said C clusters.

2. The method of claim 1, wherein said clustering comprises grouping brokers within said C clusters using geographic proximity of brokers within said publish-subscribe system.

3. The method of claim 1, wherein said using comprises: matching the event against all subscriptions of the publish-subscribe system; sorting a resulting list of brokers having subscriptions for the event by cluster; thereafter, ascertaining the multicast group in each cluster that contains those brokers destined to receive the event; and performing up to C multicasts of the event to those multicast groups of the C clusters, wherein each multicast goes to a different cluster of said C clusters.

4. The method of claim 3, wherein said ascertaining the multicast group comprises ascertaining the multicast group of each cluster that contains precisely those brokers destined to receive the event.

5. The method of claim 3, wherein said ascertaining the multicast group comprises ascertaining the multicast group of each cluster that approximately contains those brokers destined to receive the event, wherein the ascertaining is approximate in that one multicast group in each cluster comprises an "all broker" multicast group, and said performing up to C multicasts comprises, for a multicast to a particular cluster, using the "all broker" multicast group if the event is to be published to more than a threshold number T of brokers in the cluster, wherein T< a total number of brokers in the cluster.

6. The method of claim 1, wherein said mapping comprises clustering all brokers of the publish-subscribe system into C clusters, each cluster comprising a mutually exclusive subset of brokers of the publish-subscribe system.

7. The method of claim 6, wherein said clustering comprises choosing a broker of the publish-subscribe system that has not already been allocated to a cluster and building a cluster by using latency between brokers to group brokers within the cluster.

8. The method of claim 7, wherein said mapping further comprises for each cluster, assigning brokers to each individual broker subset derived from a total number of brokers in the cluster, wherein one multicast group is assigned to each such broker subset, and wherein the brokers in each subset join the multicast group assigned to that subset.

9. The method of claim 6, further comprising providing a publisher matching tree on each publishing broker of the publish-subscribe system, and providing a subscriber matching tree on each subscribing broker of the publish-subscribe system, wherein the publisher matching tree contains subscriptions annotated with a 2D bit vector of C rows and K columns, wherein C equals a number of clusters, and K equals a number of brokers within the particular cluster, and wherein said subscriber matching tree comprises subscriptions annotated with consumer ids.

10. The method of claim 9, wherein said using comprises at a publishing broker, creating a 2 bit-vector "mask" of all zeros, wherein a number of rows of the "mask" equals a number of clusters and a number of columns of the "mask" equals a number of brokers within a cluster, traversing the publisher matching tree, and for each leaf node visited, performing an "OR" operation between the "mask" and the 2D bit vector annotation at the leaf node, and upon completion of said traversing of the publisher matching tree, multicasting the event once to each cluster having at least one "1" in a corresponding row of a result mask obtained from said performing the "OR" operation, wherein multicast addresses are determined by appending each row in the result mask to a corresponding cluster id (in binary), and subsequent to said multicasting, traversing the subscriber matching tree at a subscribing broker, and sending the event to each subscribing client thereof.

11. The method of claim 10, wherein said multicast addresses are determined as follows: for cluster id Ci, if a corresponding row in the result mask has no more than a threshold T of "1"s, its multicast address is Ci appended with the row's value; and for cluster id Ci, if a corresponding row in the result mask has more than the threshold T of "1"s, the multicast address is a special "cluster broadcast" address.

12. The method of claim 11, further comprising at the subscribing broker, discarding the event if there are no subscribers to the event.

13. At least one program storage device readable by a machine, tangibly embodying at least one program of instructions executable by the machine to perform a method of implementing a content-based publish-subscribe system using a group-based multicast, said method comprising:

mapping possible groups of the content-based publish-subscribe system to a smaller number of multicast groups, wherein said smaller number of multicast groups comprise brokers, said brokers having consumers;

using the smaller number of multicast groups to forward an event to interested consumers within the content-based publish-subscribe system;

wherein said mapping comprises clustering brokers of the publish-subscribe system into C clusters, wherein each cluster of said C clusters has its own subset of multicast groups, and wherein C>1; and wherein said using comprises multicasting the event to interested consumers using the smaller number of groups, and wherein said multicasting comprises multicasting the event up to C times, each multicasting being to interested consumers within a different cluster of said C clusters.

14. The at least one program storage device of claim 13, wherein said clustering comprises grouping brokers within said C clusters using geographic proximity of brokers within said publish-subscribe system.

15. The at least one program storage device of claim 13, wherein said using comprises: matching the event against all subscriptions of the publish-subscribe system; sorting a resulting list of brokers having subscriptions for the event by cluster; thereafter, ascertaining the multicast group in each cluster that contains those brokers destined to receive the event; and performing up to C multicasts of the event to those multicast groups of the C clusters, wherein each multicast goes to a different cluster of said C clusters.

16. The at least one program storage device of claim 15, wherein said ascertaining the multicast group comprises ascertaining the multicast group of each cluster that contains precisely those brokers destined to receive the event.

17. The at least one program storage device of claim 15, wherein said ascertaining the multicast group comprises ascertaining the multicast group of each cluster that approximately contains those brokers destined to receive the event, wherein the ascertaining is approximate in that one multicast group in each cluster comprises an "all broker" multicast group, and said performing up to C multicasts comprises, for a multicast to a particular cluster, using the "all broker" multicast group if the event is to be published to more than a threshold number T of brokers in the cluster, wherein T< a total number of brokers in the cluster.

18. The at least one program storage device of claim 13, wherein said mapping comprises clustering all brokers of the publish-subscribe system into C clusters, each cluster comprising a mutually exclusive subset of brokers of the publish-subscribe system.

19. The at least one program storage device of claim 18, wherein said clustering comprises choosing a broker of the publish-subscribe system that has not already been allocated to a cluster and building a cluster by using latency between brokers to group brokers within the cluster.

20. The at least one program storage device of claim 19, wherein said mapping further comprises for each cluster, assigning brokers to each individual broker subset derived from a total number of brokers in the cluster, wherein one multicast group is assigned to each such broker subset, and wherein the brokers in each subset join the multicast group assigned to that subset.

21. The at least one program storage device of claim 18, further comprising providing a publisher matching tree on each publishing broker of the publish-subscribe system, and providing a subscriber matching tree on each subscribing broker of the publish-subscribe system, wherein the publisher matching tree contains subscriptions annotated with a 2D bit vector of C rows and K columns, wherein C equals a number of clusters, and K equals a number of brokers within the particular cluster, and wherein said subscriber matching tree comprises subscriptions annotated with consumer ids.

22. The at least one program storage device of claim 21, wherein said using comprises at a publishing broker, creating a 2 bit-vector "mask" of all zeros, wherein a number of rows of the "mask" equals a number of clusters and a number of columns of the "mask" equals a number of brokers within a cluster, traversing the publisher matching tree, and for each leaf node visited, performing an "OR" operation between the "mask" and the 2D bit vector annotation at the leaf node, and upon completion of said traversing of the publisher matching tree, multicasting the event once to each cluster having at least one "1" in a corresponding row of a result mask obtained from said performing the "OR" operation, wherein multicast addresses are determined by appending each row in the result mask to a corresponding cluster id (in binary), and subsequent to said multicasting, traversing the subscriber matching tree at a subscribing broker, and sending the event to each subscribing client thereof.

23. The at least one program storage device of claim 22, wherein said multicast addresses are determined as follows: for cluster id Ci, if a corresponding row in the result mask has no more than a threshold T of "1"s, its multicast address is Ci appended with the row's value; and for cluster id Ci, if a corresponding row in the result mask has more than the threshold T of "1"s, the multicast address is a special "cluster broadcast" address.

24. The at least one program storage device of claim 23, further comprising at the subscribing broker, discarding the event if there are no subscribers to the event.

25. A system for implementing a content-based publish-subscribe system using a group-based multicast, said system comprising:

means for mapping possible groups of the content-based publish-subscribe system to a smaller number of multicast groups, wherein said smaller number of multicast groups comprise brokers, said brokers having consumers;

means for using the smaller number of multicast groups to forward an event to interested consumers within the content-based publish-subscribe system;

wherein said means for mapping comprises means for clustering brokers of the publish-subscribe system into C clusters, wherein each cluster of said C clusters has its own subset of multicast groups, and wherein C>1; and wherein said means for using comprises means for multicasting the event to interested consumers using the smaller number of groups, and wherein said means for multicasting comprises means for multicasting the event up to C times, each multicasting being to interested consumers within a different cluster of said C clusters.

26. The system of claim 25, wherein said means for clustering comprises means for grouping brokers within said C clusters using geographic proximity of brokers within said publish-subscribe system.

27. The system of claim 25, wherein said means for using comprises: means for matching the event against all subscriptions of the publish-subscribe system; means for sorting a resulting list of brokers having subscriptions for the event by cluster; thereafter, means for ascertaining the multicast group in each cluster that contains those brokers destined to receive the event; and means for performing up to C multicasts of the event to those multicast groups of the C clusters, wherein each multicast goes to a different cluster of said C clusters.

28. The system of claim 19, wherein said means for ascertaining the multicast group comprises means for ascertaining the multicast group of each cluster that contains precisely those brokers destined to receive the event.

29. The system of claim 19, wherein said means for ascertaining the multicast group comprises means for ascertaining the multicast group of each cluster that approximately contains those brokers destined to receive the event, wherein the means for ascertaining is approximate in that one multicast group in each cluster comprises an "all broker" multicast group, and said means for performing up to C multicasts comprises, for a multicast to a particular cluster, means for using the "all broker" multicast group if the event is to be published to more than a threshold number T of brokers in the cluster, wherein T< a total number of brokers in the cluster.

30. The system of claim 25, wherein said means for mapping comprises means for clustering all brokers of the publish-subscribe system into C clusters, each cluster comprising a mutually exclusive subset of brokers of the publish-subscribe system.

31. The system of claim 30, wherein said means for clustering comprises means for choosing a broker of the publish-subscribe system that has not already been allocated to a cluster and means for building a cluster by using latency between brokers to group brokers within the cluster.

32. The system of claim 31, wherein said means for mapping further comprises for each cluster, means for assigning brokers to each individual broker subset derived from a total number of brokers in the cluster, wherein one multicast group is assigned to each such broker subset, and wherein the brokers in each subset join the multicast group assigned to that subset.

33. The system of claim 30, further comprising means for providing a publisher matching tree on each publishing broker of the publish-subscribe system, and means for providing a subscriber matching tree on each subscribing broker of the publish-subscribe system, wherein the publisher matching tree contains subscriptions annotated with a 2D bit vector of C rows and K columns, wherein C equals a number of clusters, and K equals a number of brokers within the particular cluster, and wherein said subscriber matching tree comprises subscriptions annotated with consumer ids.

34. The system of claim 33, wherein said means for using comprises at a publishing broker, means for creating a 2 bit-vector "mask" of all zeros, wherein a number of rows of the "mask" equals a number of clusters and a number of columns of the "mask" equals a number of brokers within a cluster, means for traversing the publisher matching tree, and for each leaf node visited, means for performing an "OR" operation between the "mask" and the 2D bit vector annotation at the leaf node, and upon completion of said traversing of the publisher matching tree, means for multicasting the event once to each cluster having at least one "1" in a corresponding row of a result mask obtained from said means for performing the "OR" operation, wherein multicast addresses are determined by appending each row in the result mask to a corresponding cluster id (in binary), and subsequent to said multicasting, means for traversing the subscriber matching tree at a subscribing broker, and sending the event to each subscribing client thereof.

35. The system of claim 34, wherein said multicast addresses are determined as follows: for cluster id $C_i$, if a corresponding row in the result mask has no more than a threshold T of "1"s, its multicast address is $C_i$ appended with the row's value; and for cluster id $C_i$, if a corresponding row in the result mask has more than the threshold T of "1"s, the multicast address is a special "cluster broadcast" address.

36. The system of claim 35, further comprising at the subscribing broker, means for discarding the event if there are no subscribers to the event.

* * * * *

UNITED STATES PATENT AND TRADEMARK OFFICE
CERTIFICATE OF CORRECTION

PATENT NO. : 6,336,119 B1
DATED : January 1, 2002
INVENTOR(S) : Banavar et al.

It is certified that error appears in the above-identified patent and that said Letters Patent is hereby corrected as shown below:

Title page,
Item [54], Title: delete the word "SYSTEM" at the end of the title, and insert
-- SYSTEMS --

Column 3,
Line 7, delete the word "of"

Signed and Sealed this

Sixteenth Day of April, 2002

*Attest:*

JAMES E. ROGAN
*Attesting Officer*   *Director of the United States Patent and Trademark Office*